(12) United States Patent
Liu

(10) Patent No.: US 12,481,511 B2
(45) Date of Patent: Nov. 25, 2025

(54) METHOD AND APPARATUS FOR MICROSERVICE CONFIGURATION, ELECTRONIC DEVICE, SYSTEM, AND STORAGE MEDIUM

(71) Applicant: Beijing Baidu Netcom Science Technology Co., Ltd., Beijing (CN)

(72) Inventor: Chao Liu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 168 days.

(21) Appl. No.: 17/914,893

(22) PCT Filed: Oct. 14, 2021

(86) PCT No.: PCT/CN2021/123921
§ 371 (c)(1),
(2) Date: Sep. 27, 2022

(87) PCT Pub. No.: WO2022/170782
PCT Pub. Date: Aug. 18, 2022

(65) Prior Publication Data
US 2024/0231840 A1 Jul. 11, 2024

(30) Foreign Application Priority Data

Feb. 10, 2021 (CN) .......................... 202110185215.5

(51) Int. Cl.
*G06F 9/44* (2018.01)
*G06F 9/445* (2018.01)

(52) U.S. Cl.
CPC ................................ *G06F 9/44505* (2013.01)

(58) Field of Classification Search
CPC ................. G06F 1/32; G06F 9/44; G06F 1/12
See application file for complete search history.

(56) References Cited

U.S. PATENT DOCUMENTS

| | | | |
|---|---|---|---|
| 8,650,294 B2* | 2/2014 | Thyni | G06Q 50/188 |
| | | | 709/225 |
| 2007/0127451 A1* | 6/2007 | Jung | H04M 1/72406 |
| | | | 370/356 |

(Continued)

FOREIGN PATENT DOCUMENTS

| | | |
|---|---|---|
| CN | 108134696 A | 6/2018 |
| CN | 108540529 A | 9/2018 |

(Continued)

OTHER PUBLICATIONS

Istio OpenShift Mesh , Software Design, 日本, (株)技術評論社, 2020年01月18日, 2020年1月号, p. 44-52.

(Continued)

*Primary Examiner* — Keshab R Pandey
(74) *Attorney, Agent, or Firm* — Moore & Van Allen PLLC

(57) ABSTRACT

Provided are a method and apparatus for microservice configuration, an electronic device, a system and a storage medium in the present disclosure, relates to the field of computer technologies, and in particular to the field of cloud computing, Internet of things, etc. A specific implementation solution is as follows. Configuration data is received from a main cluster; a service data acquisition request is sent to the main cluster in response to determining that service data in the main cluster has been changed, and the changed service data is received from the main cluster; and at least one service governance task is executed according to the configuration data and the changed service data.

14 Claims, 7 Drawing Sheets

(56) References Cited

U.S. PATENT DOCUMENTS

| | | | | |
|---|---|---|---|---|
| 2014/0297790 | A1* | 10/2014 | Song | H04N 21/251 709/217 |
| 2020/0133689 | A1 | 4/2020 | Ferrell et al. | |
| 2020/0348918 | A1* | 11/2020 | Giannetti | H04L 61/3025 |

FOREIGN PATENT DOCUMENTS

| | | |
|---|---|---|
| CN | 110673881 A | 1/2020 |
| CN | 110874329 A | 3/2020 |
| CN | 110971449 A | 4/2020 |
| CN | 111930758 A | 11/2020 |
| CN | 112860342 A | 5/2021 |
| KR | 1020200025821 A1 | 3/2020 |

OTHER PUBLICATIONS

Habanerots Toshiba Industrial IoT Platform Service Enabling Rapid Start of CPS Services Utilizing Service Mesh Technology, [on l i n e], 2020年09月30日, vol. 75 No. 5, p. 31-34.

Yoshikawa Ryota, Site Reliability Engineering, Web+DB Press, 日本,(株)技術評論社, vol. 107, p. 104-111.

Srini Bhagavan et al: "Achieving Operational Scalability Using Razee Continuous", arxiv.org, Cornell University Library, 201Olin Library Cornell University Ithaca, NY14853, Dec. 18, 2020.

International Search Report of the counterpart PCT application No. PCT/CN2021/123921 issued on Jan. 17, 2022.

First Search Report of the counterpart CN application No. 202110185215.5 issued on May 25, 2023.

Extend Search Report of the counterpart EP application No. 21925429.9 issued on Dec. 8, 2023.

First Office Action of the counterpart JP application No. 2022-559897 issued on Jul. 13, 2023.

First Office Action of the counterpart KR application No. 10-2022-7034296 issued on Aug. 29, 2024.

International Search Report issued for International Patent Application No. PCT/CN2021/123921, dated Jan. 17, 2022.

Written Opinion issued for International Patent Application No. PCT/CN2021/123921, dated Jan. 17, 2022.

* cited by examiner

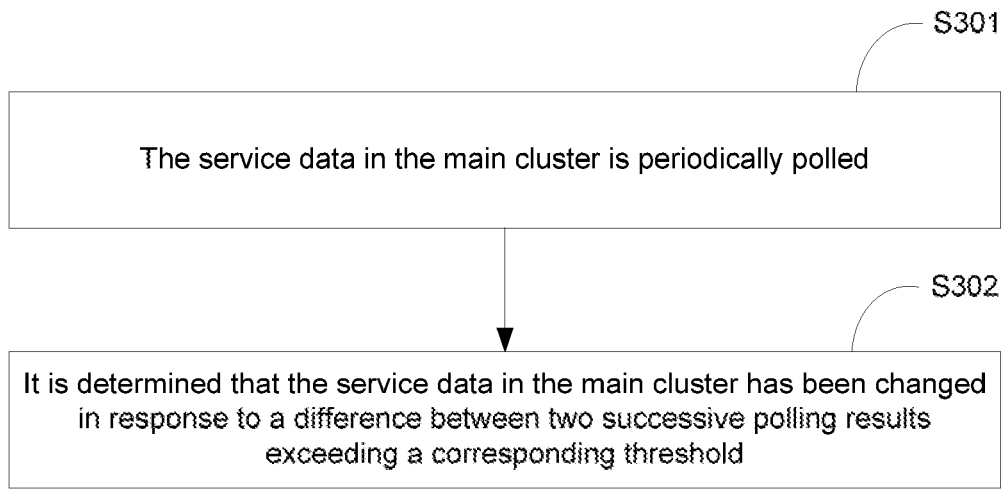
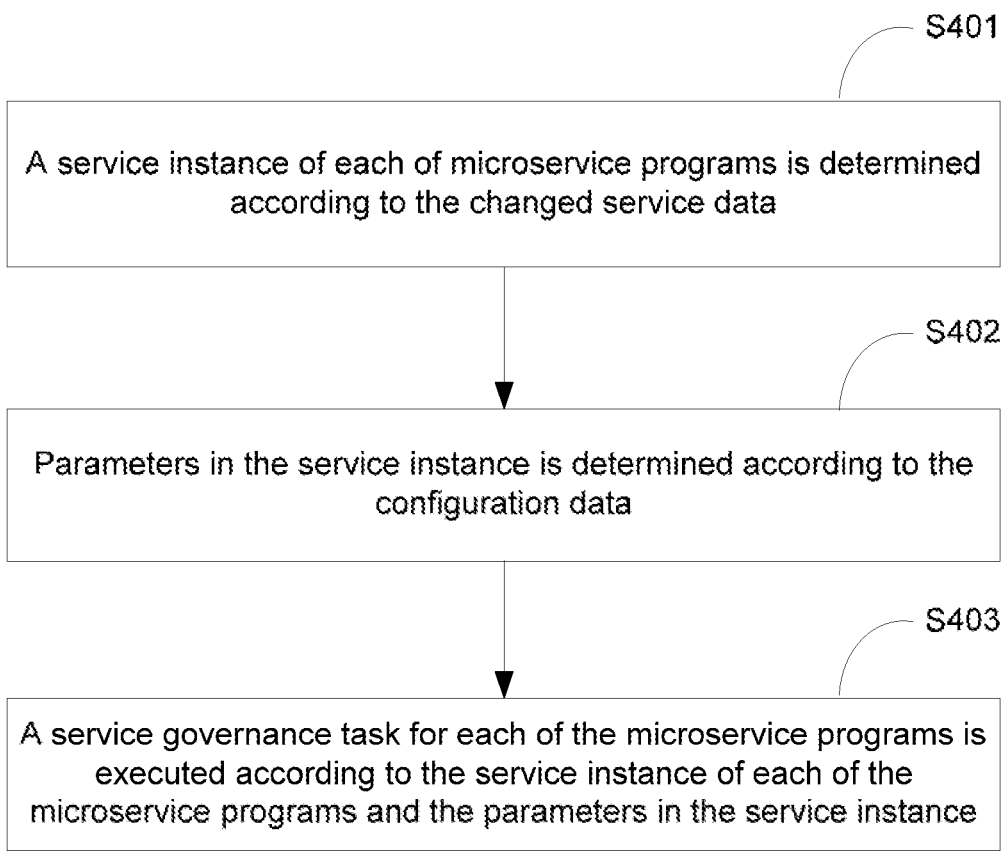

METHOD AND APPARATUS FOR MICROSERVICE CONFIGURATION, ELECTRONIC DEVICE, SYSTEM, AND STORAGE MEDIUM

CROSS-REFERENCE TO RELATED APPLICATION

The present disclosure claims the priority to Chinese Patent Application No. 202110185215.5, filed to the International Bureau on Feb. 10, 2021, and titled "METHOD AND APPARATUS FOR MICROSERVICE CONFIGURATION, ELECTRONIC DEVICE, SYSTEM AND STORAGE MEDIUM", which is incorporated in its entirety herein by reference.

TECHNICAL FIELD

The present disclosure relates to the field of computer technologies, and in particular to a method and apparatus for microservice configuration, an electronic device, a system and a storage medium.

BACKGROUND OF THE INVENTION

With rapid development of the cloud native technology and widespread implementation of microservices, service mesh technology has taken a growing interest and favor.

Compared with a monolithic application, a microservice architecture features division of the monolithic application into multiple microservice components towards clear responsibilities. In the case of a wide range of microservice components, microservice configuration may be delayed or incorrect, thereby affecting operation stability of the microservice architecture.

SUMMARY OF THE INVENTION

At least some embodiments of the present disclosure provide a method and apparatus for microservice configuration, an electronic device, a system and a storage medium.

According to one embodiment of the present disclosure, a method for microservice configuration is provided and applied to service clusters. The method may include:
receiving configuration data from a main cluster; sending a service data acquisition request to the main cluster in response to determining that service data in the main cluster has been changed, and receiving changed service data from the main cluster; and
executing at least one service governance task according to the configuration data and the changed service data.

According to another embodiment of the present disclosure, a method for microservice configuration is provided, which is applied to a main cluster. The method may include:
sending changed configuration data to each of service clusters in response to configuration data having been changed; and
sending changed service data corresponding to a service data acquisition request to the corresponding service cluster in response to receiving the service data acquisition request of at least one of the service clusters.

According to another embodiment of the present disclosure, an apparatus for microservice configuration is provided. The apparatus may include:
a control plane component, configured to receive configuration data from a main cluster; and
a data plane component, configured to send a service data acquisition request to the main cluster in response to determining that service data in the main cluster has been changed and receive changed service data from the main cluster, and
the data plane component, further configured to execute at least one service governance task according to the configuration data and the changed service data.

According to another embodiment of the present disclosure, an apparatus for microservice configuration is provided. The apparatus may include:
a configuration center component, configured to send changed configuration data to each of service clusters in response to configuration data having been changed; and
a registry component, configured to send changed service data corresponding to a service data acquisition request to the corresponding service cluster in response to receiving the service data acquisition request of at least one of the service clusters.

According to another embodiment of the present disclosure, a microservice system is provided. The system may include:
at least one service cluster, each of the at least one service cluster being configured to execute the above method for microservice configuration, applied to service clusters; and
a main cluster, configured to execute the above method for microservice configuration, applied to a main cluster.

According to another embodiment of the present disclosure, an electronic device is provided. The electronic device includes:
at least one processor; and
a memory communicatively connected with the at least one processor, where
the memory is configured to store at least one instruction executable by the at least one processor, and the at least one instruction is executed by the at least one processor to cause the at least one processor to execute the method in any one of embodiments of the present disclosure.

According to another embodiment of the present disclosure, a non-transitory computer-readable storage medium storing at least one computer instruction is provided. The at least one computer instruction is configured to cause a computer to execute the method in any one of embodiments of the present disclosure.

According to another embodiment of the present disclosure, a computer program product is provided. The computer program product includes a computer program, where the computer program implements the method in any one of embodiments of the present disclosure when executed by a processor.

Through above solution of the present disclosure, the service clusters may acquire the service data in an active acquisition manner, which has the advantages that a load of the main cluster may be reduced, and stability of the main cluster may be greatly improved especially in a scenario in which the number of service clusters is large.

It should be understood that the content described in this section is not intended to identify key or critical features of embodiments of the present disclosure, nor is it intended to limit the scope of the present disclosure. Other features of the present disclosure will be readily understood by the following description.

BRIEF DESCRIPTION OF THE DRAWINGS

FIG. 3 is a flowchart of determining whether service data has been changed according to an embodiment of the present disclosure.

FIG. 4 is a flowchart of executing at least one service governance task according to an embodiment of the present disclosure.

DETAILED DESCRIPTION OF THE INVENTION

Exemplary embodiments of the present disclosure are described below in combination with the drawings, including various details of the embodiments of the present disclosure to facilitate understanding, which should be considered as exemplary. Thus, those skilled in the art should recognize that various changes and modifications may be made to the embodiments described herein without departing from the scope and spirit of the present disclosure. Likewise, descriptions of well-known functions and structures are omitted in the following description for clarity and conciseness.

Figure 1:
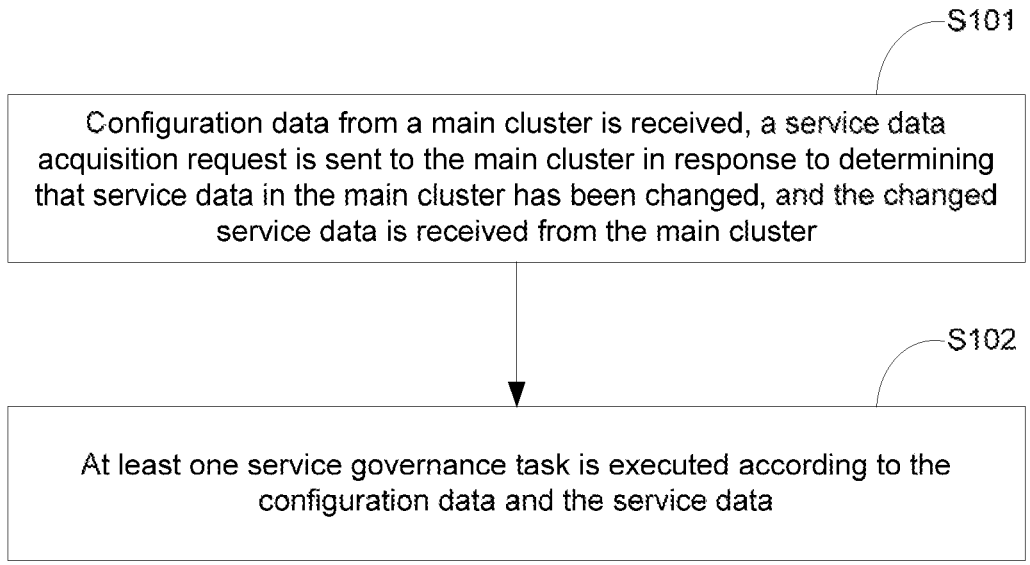
FIG. 1 is a flowchart of a method for microservice configuration applied to service clusters according to an embodiment of the present disclosure.

As shown in FIG. 1, an embodiment of the present disclosure provides a method for microservice configuration applied to service clusters. The method includes the following steps.

In step S101, configuration data from a main cluster is received, a service data acquisition request is sent to the main cluster in response to determining that service data in the main cluster has been changed, and the changed service data is received from the main cluster.

In step S102, at least one service governance task is executed according to the configuration data and the service data.

A microservice architecture involved in the present disclosure may include a main cluster and at least one service cluster. Each of the at least one service cluster may acquire data from the main cluster by means of active acquisition and passive acquisition, so as to execute at least one service governance task according to the acquired data.

Each of the at least one service cluster may at least include a control plane component and a data plane component which are provided with upstream and downstream communication logics.

The control plane component is configured to push the service data and the configuration data to the data plane component. The control plane component may include a pilot component.

The data plane component may include a sidecar component and a microservice program. The sidecar component and the microservice program may be deployed together. That is, one microservice program correspondingly deploys one sidecar component.

The sidecar component is configured to take over all traffic to and from the microservice program, to execute the at least one service governance service. For example, the at least one service governance services may include service routing, service traffic limiting, service fusing, fault injection, traffic playback, etc.

The configuration data may be obtained through long connection. That is, when the configuration data has been changed, each of the at least one service cluster may acquire the changed configuration data actively sent by the main cluster.

On the other hand, each of the at least one service cluster may adopt an active polling mode to determine whether the service data has been changed in the main cluster. The changed service data may include modification, deletion and/or update of the service data by a user.

The specific mode of determining the change may include: detect a change action of the user in real time, regularly compare and detect the service data, acquire the change of the service data actively informed by the user, etc.

In response to determining that the service data in the main cluster has been changed, each of the at least one service cluster may actively send the service data acquisition request to the main cluster. In response to the main cluster receiving the service data acquisition request, the changed service data corresponding to the service data acquisition request may be determined according to the content of the service data acquisition request. The changed service data corresponding to the service data acquisition request is sent to the corresponding service cluster.

In response to the corresponding service cluster receiving the service data sent by the main cluster, the service governance task may be executed according to the configuration data and the changed service data.

Compared with the case that configuration data and service data are all actively issued by means of a main cluster, each of the at least one service cluster may acquire the changed service data in an active acquisition manner with the above solution of the present disclosure, which has the advantages that a load of the main cluster may be reduced, and stability of the main cluster may be greatly improved especially in a scenario in which the number of service clusters is large.

Figure 2:
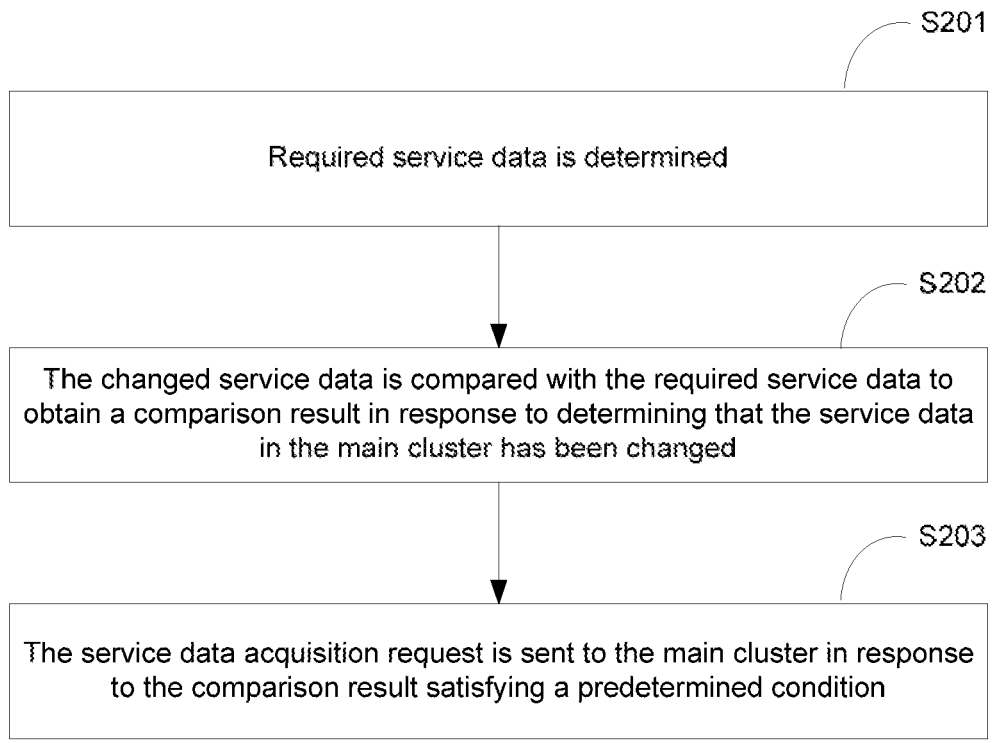
FIG. 2 is a flowchart of sending a service data acquisition request according to an embodiment of the present disclosure.

As shown in FIG. 2, in an optional embodiment, the step S102 of sending the service data acquisition request to the main cluster in response to determining that service data in the main cluster has been changed, may specifically include the following steps.

In step S201, required service data is determined.

In step S202, the changed service data is compared with the required service data to obtain a comparison result in response to determining that the service data in the main cluster has been changed.

In step S203, the service data acquisition request is sent to the main cluster in response to the comparison result satisfying a predetermined condition.

The required service data may be determined according to configuration information pre-formulated by the user, or may be determined according to an instruction pre-issued by the user. For example, the service data required by each of the microservice programs may be determined according to the number of microservice programs and functions corresponding to each of the microservice programs. The service data required by each of the microservice programs may be used as the service data required by each of the at least one service cluster.

In response to having multiple service clusters, each of the multiple service clusters may determine the required service data separately.

Each of the multiple service cluster may periodically send service data change inquiry information to the main cluster, so as to determine whether the service data in the main cluster has been changed. For example, it may be determined that the service data in the main cluster has been changed in response to each of the multiple service clusters receiving "service data has been changed" or "XX type of service data has been changed" of the main cluster. Alternatively, each of the multiple service clusters may send a service data list acquisition request to the main cluster, and in response to having a difference between contents in a service data list successively received twice, it may be determined that the service data in the main cluster has been changed.

The changed service data is compared with the required service data to obtain a comparison result in response to determining that the service data in the main cluster has been changed. In response to the comparison result satisfying a predetermined condition, each of the multiple service clusters may send the service data acquisition request to the main cluster.

The above confirmation process for determining whether the service data in the main cluster has been changed may be executed by means of the sidecar component in each of the multiple service clusters.

For example, a service cluster in a region A includes a first sidecar component A1, a second sidecar component A2 and a third sidecar component A3. The first sidecar component A1 and an application (APP) 1 are deployed together. The second sidecar component A2 and an APP 2 are deployed together. The third sidecar component A3 and an APP 3 are deployed together. The first sidecar component A1 may determine a A1 type of data as service data required by the APP 1, and the second sidecar component A2 may determine a A2 type of data as service data required by the APP 2, and the third sidecar component A3 may determine a A3 type of data as service data required by the APP 3. In response to the three sidecar components all determining that the A2 type of service data has been changed, the second sidecar component A2 may sent the service data acquisition request to the main cluster, so as to request to acquire the A2 type of service data.

For another example, in response to the A1, A2 and A3 types of service data being changed, the first sidecar component A1 sends a service data acquisition request to the main cluster, so as to request to acquire the A1 type of service data. The second sidecar component A2 sends a service data acquisition request to the main cluster, so as to request to acquire the A2 type of service data. The third sidecar component A3 sends a service data acquisition request to the main cluster, so as to request to acquire the A3 type of service data.

With the above solution, in response to the service data having been changed, each of the multiple service clusters may obtain the required service data through the service data acquisition request. Compared with the case that all updated data is acquired when service data is updated each time in the related art, the above solution may reduce data transmission amount. Especially for scenarios having multiple clusters, stability of a microservice system may be improved.

As shown in FIG. 3, in an optional embodiment, the step S202 of determining that the service data in the main cluster has been changed may further include the following steps.

In step S301, the service data in the main cluster is periodically polled.

In step S302, it is determined that the service data in the main cluster has been changed in response to a difference between two successive polling results exceeding a corresponding threshold.

Each of the sidecar components in each of the at least one service cluster may periodically send polling information to the main cluster, so as to obtain a polling result fed back by the main cluster. In response to the difference between the two successive polling results exceeding the corresponding threshold, it may be determined that the service data in the main cluster has been changed.

Exemplarily, the corresponding threshold may be 10% by which a difference factor exceeds. Alternatively, weights of different parameters in the service data may be set, and it may be determined that the service data in the main cluster has been changed in response to the parameters having high weights being changed.

With the above solution, the change condition of the service data may be determined flexibly and quickly.

As shown in FIG. 4, in an optional embodiment, the step S102 of executing the at least one service governance task according to the configuration data and the changed service data may include the following steps.

In step S401, a service instance of each of microservice programs is determined according to the changed service data.

In step S402, parameters in the service instance is determined according to the configuration data.

In step S403, a service governance task for each of the microservice programs is executed according to the service instance of each of the microservice programs and the parameters in the service instance.

The service data may be used for representing the service instances of the microservice programs in each of the at least one service cluster. The service instance may be a specific function executed by the microservice program. With the microservice architecture as a shopping scenario as an example, according to the received service data, it may be determined that the service instance of the microservice program includes commodity information inquiry, a shopping cart (commodities to be paid), billing and logistics inquiry, etc.

Multiple microservice programs may be contained in one service cluster, and each of the microservice programs may correspond to one service instance.

The configuration data may correspond to the parameters in the service instances. For example, it may be clear that a billing microservice program may call data from a shopping cart microservice program without calling data from a logistics microservice program. For another example, the configuration data may be a communication connection attempt time threshold, etc. of the shopping cart microservice program and the billing microservice program.

Exemplarily, the sidecar component deployed together with the logistics microservice program may control the logistics microservice program to call information of billed items in the billing microservice program, such that logistics states of billed items may be inquired in the logistics microservice program. For another example, the sidecar component may control the communication attempt to retry, or stop communication connection attempt, etc. when the communication connection attempt time of the shopping cart microservice program and the billing microservice program exceeds the communication connection attempt time threshold.

Objects included in the service data and the configuration data are described above exemplarily, which does not limit the content of protection.

The sidecar component may implement the service governance task for the microservice program deployed together with the sidecar component according to the changed service data and the configuration data.

In an optional embodiment, multiple service clusters are arranged in different regions respectively, and the at least one service governance task executed by the service clusters in each of the regions are the same.

By means of the service clusters in different regions, the principle of nearby access of the user may be satisfied, thereby improving use experience of the user. Further, with the shopping scenario as an example, for example, a user living in Beijing may preferentially access the service cluster arranged in Beijing, such that a faster access response may be obtained by the user living in Beijing.

In addition, the service clusters of different regions may constitute a remote multi-activity, and even if a certain service cluster fails, overall smooth operation of the microservice architecture may still be ensured.

Since at least some embodiments of the present disclosure adopt the manner of active acquisition of the service data by the service cluster, requirements of large-scale service instances may be further satisfied even for a scenario having the multiple clusters.

Figure 5:
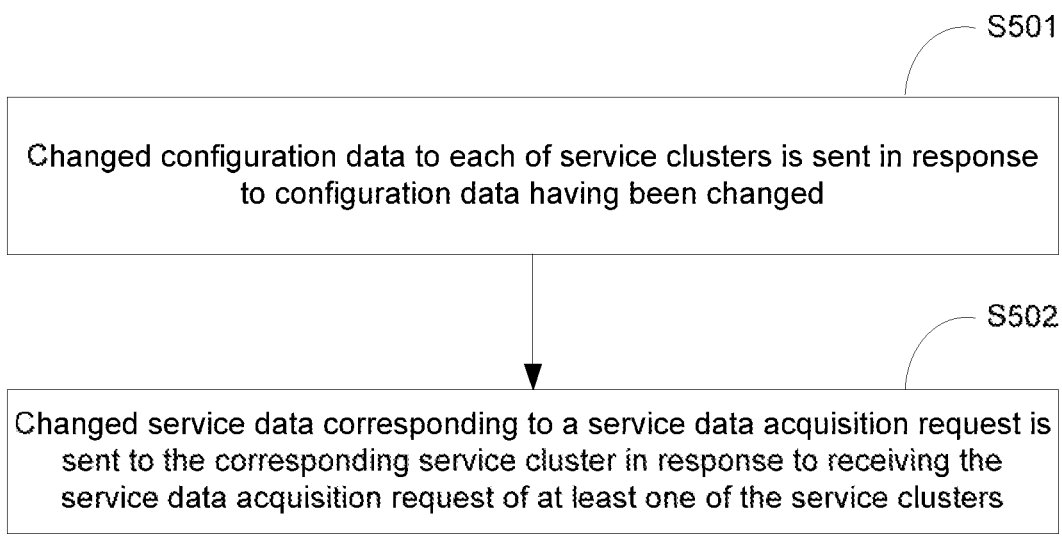
FIG. 5 is a flowchart of a method for microservice configuration applied to a main cluster according to an embodiment of the present disclosure.

As shown in FIG. 5, the present disclosure relates to a method for microservice configuration applied to a main cluster. The method includes the following steps.

In step S501, changed configuration data to each of service clusters is sent in response to configuration data having been changed; and In step S502, changed service data corresponding to a service data acquisition request is sent to the corresponding service cluster in response to receiving the service data acquisition request of at least one of the service clusters.

A main function of the main cluster is to receive the service data and the configuration data of the user, and send the service data and the configuration data to each of the at least one service cluster.

For the configuration data, a configuration center component of the main cluster may may determine whether the configuration data has been changed through active polling detection or passive reception notification. The change may include editing, deleting, or updating.

In response to the configuration data having been changed, the configuration data is actively issued to each of the at least one service cluster. With the above solution, the configuration data may be shared between the multiple service clusters, such that interconnection and intercommunication and common service governance of each of the service clusters may be achieved. The configuration data may include custom resource definition (CRD) data.

In addition, the registry component of the main cluster may utilize may receive requests for the at least one service cluster. In response to receiving the service data acquisition request of any of the service clusters, the service data corresponding to the service data acquisition request may be determined by analyzing the service data acquisition request of the service cluster. The service data corresponding to the service data acquisition request is sent to the corresponding service cluster.

With the above solution, the main cluster determines the corresponding service data according to the request in response to receiving the request of the service cluster. Compared with the mode of active issue of the main cluster, the solution of the present disclosure may avoid redundancy of service data issue to a maximum extent. In view of this, the load of the main cluster may be reduced, and stability of the main cluster may be greatly improved especially in a scenario in which the number of service clusters is large.

Figure 6:
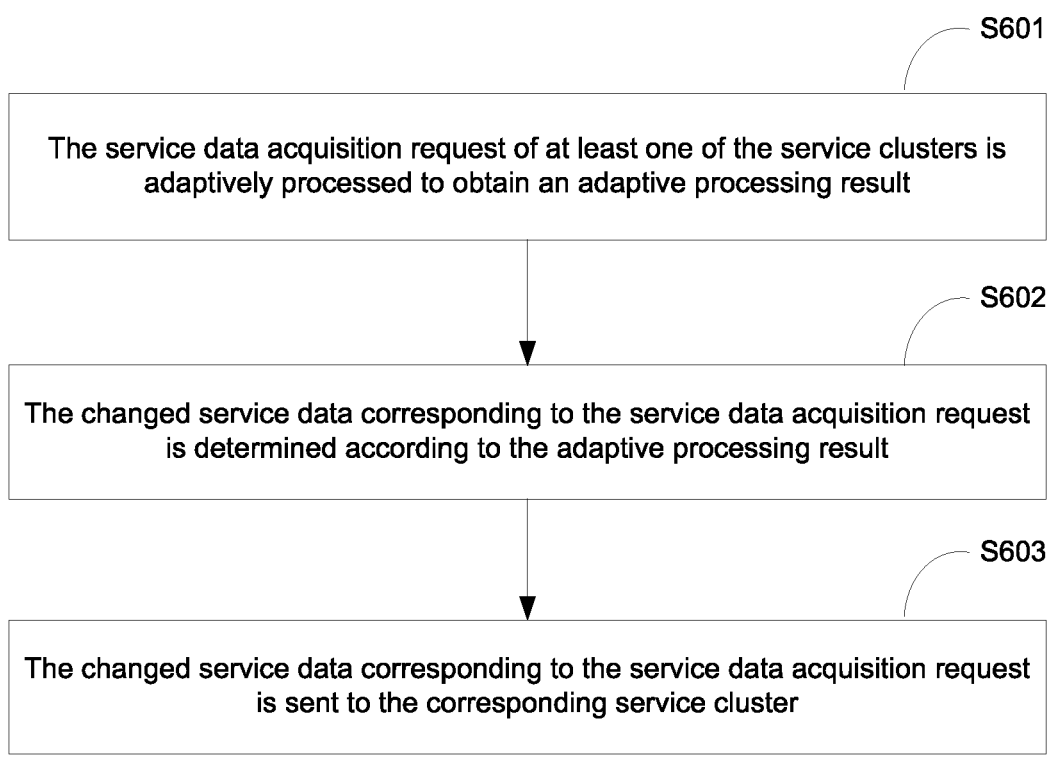
FIG. 6 is a flowchart of sending service data according to an embodiment of the present disclosure.

As shown in FIG. 6, in an optional embodiment, the step S502 of sending the changed service data corresponding to the service data acquisition request to the corresponding service cluster in response to receiving the service data acquisition request of at least one of the service clusters includes the following steps.

In step S601, the service data acquisition request of at least one of the service clusters is adaptively processed to obtain an adaptive processing result.

In step S602, the changed service data corresponding to the service data acquisition request is determined according to the adaptive processing result.

In step S603, the changed service data corresponding to the service data acquisition request is sent to the corresponding service cluster.

The registry component of the main cluster may utilize may receive service data edited by the user. There are a wide range of common registry components of microservices for acquiring service data, for example, ZooKeeper (ZK), Eureka, Consul, Nacos, etc.

Since these registry components are developed and implemented by different vendors, there is no corresponding data model standard at present, which leads to the need to implement different docking solutions for different registry components. In order to shield data model differences of various registry components, an optional embodiment of the present disclosure introduces a registry proxy unit component. Data models of different registry components may be pre-stored in the registry proxy unit component. In view of this, when receiving the service data acquisition request sent by any one of the service clusters, the registry proxy unit component of the main cluster may adapt to the service data acquisition request.

According to the adaptive processing result, docking with different registry components may be implemented, such that the service data corresponding to the service data acquisition request is determined at the corresponding registry component.

In response to determining the service data corresponding to the service data acquisition request, the changed service data corresponding to the service data acquisition request may be sent to the corresponding service cluster.

With the above solution, the registry proxy unit component may overcome differences of different registries.

Figure 7:
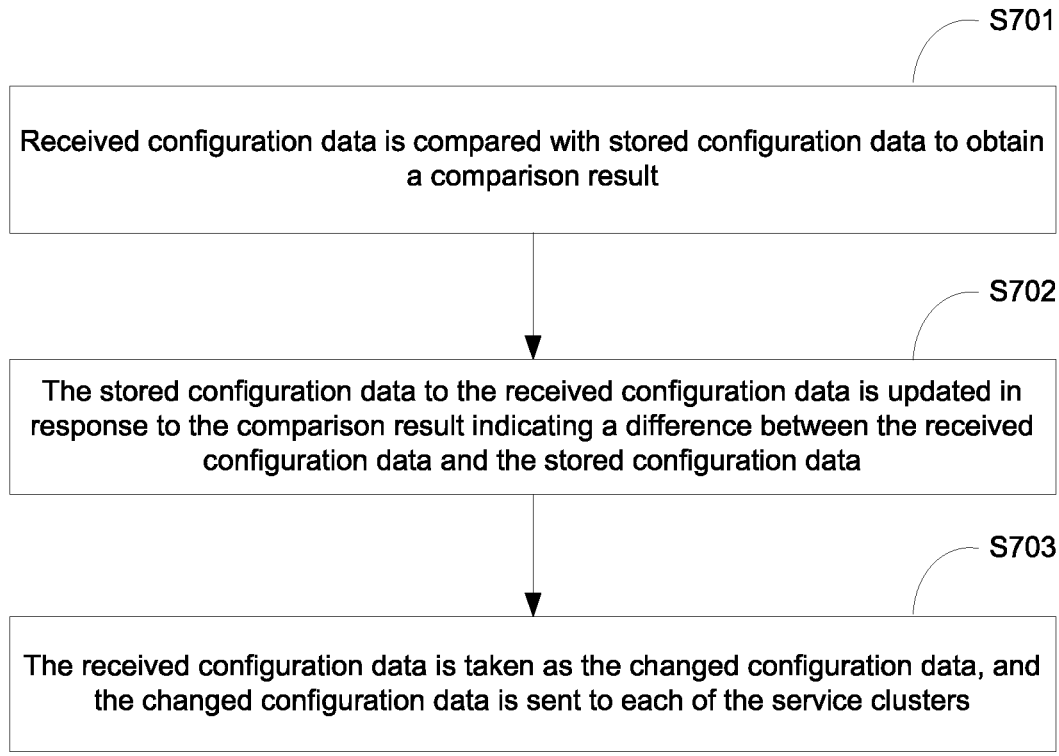
FIG. 7 is a flowchart of sending configuration data according to an embodiment of the present disclosure.

As shown in FIG. 7, in an optional embodiment, the step S501 of sending the changed configuration data to each of service clusters in response to configuration data having been changed may specifically include the following steps.

In step S701, received configuration data is compared with stored configuration data to obtain a comparison result.

In step S702, the stored configuration data to the received configuration data is updated in response to the comparison result indicating a difference between the received configuration data and the stored configuration data.

In step S703, the received configuration data is taken as the changed configuration data, and the changed configuration data is sent to each of the service clusters.

The configuration center component may call the stored configuration data in response to receiving the configuration data each time, and compare the received configuration data with the stored configuration data to obtain the comparison result.

In response to the comparison result indicating the difference between the received configuration data and the stored configuration data, it may be determined that the user changes the configuration data. Thus, the stored configuration data may be updated to the received configuration data, and the received configuration data is sent to each of the service clusters as the changed configuration data.

For determining whether the comparison result has been changed, the presence of a difference, a difference factor, or the presence of a difference of important data or high-weight data may be regarded as a determination criterion.

With the above solution, the configuration data may be issued in response to the configuration data having been changed. The frequency of issuing the configuration data is reduced to a certain extent.

Figure 8:
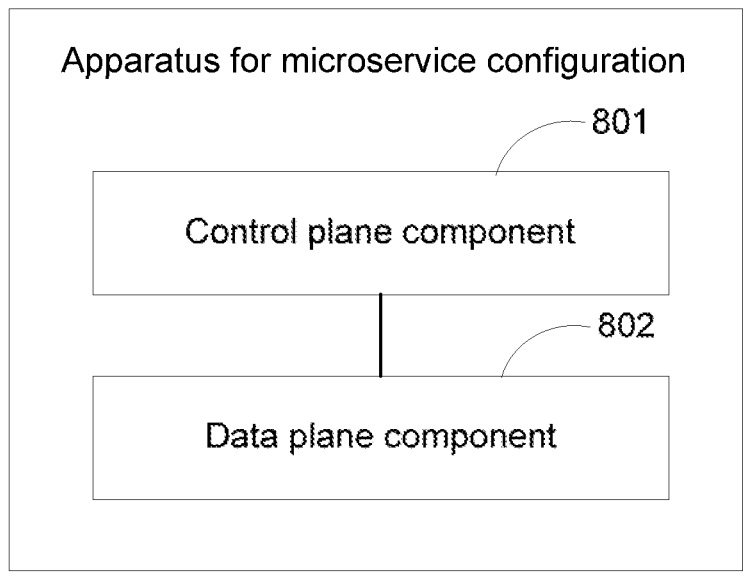
FIG. 8 is a schematic diagram of an apparatus for microservice configuration corresponding to a service cluster according to an embodiment of the present disclosure.

As shown in FIG. 8, an embodiment of the present disclosure provides an apparatus for microservice configuration. The apparatus may be applied to service clusters, and may specifically include:
- a control plane component 801, configured to receive configuration data from a main cluster; and
- a data plane component 802, configured to send a service data acquisition request to the main cluster in response to determining that service data in the main cluster has been changed and receive changed service data from the main cluster, and
- the data plane component 802, further configured to execute at least one service governance task according to the configuration data and the changed service data.

In an optional embodiment, the data plane component 802 includes a sidecar component. The sidecar component may further include the following units.
- a service data determination unit, configured to determine required service data;
- a service data comparison unit, configured to compare the changed service data with the required service data to obtain a comparison result in response to determining that the service data in the main cluster has been changed; and
- a service data acquisition request sending unit, configured to send the service data acquisition request to the main cluster in response to the comparison result satisfying a predetermined condition.

In an optional embodiment, the service data comparison unit may be specifically configured to:
periodically poll the service data in the main cluster; and
determine that the service data in the main cluster has been changed in response to a difference between two successive polling results exceeding a corresponding threshold.

In an optional embodiment, the data plane component 802 includes a sidecar component. The sidecar component may further include the following units.
- a service instance determination unit, configured to determine a service instance of each of microservice programs according to the changed service data;
- a parameter determination unit, configured to determine parameters in the service instance according to the configuration data; and
- a service governance task execution unit, configured to execute a service governance task for each of the microservice programs according to the service instance of each of the microservice programs and the parameters in the service instance.

In an optional embodiment, the multiple service clusters are arranged in different regions respectively, and at least one service governance task executed by the service clusters in each of the regions are the same.

Figure 9:
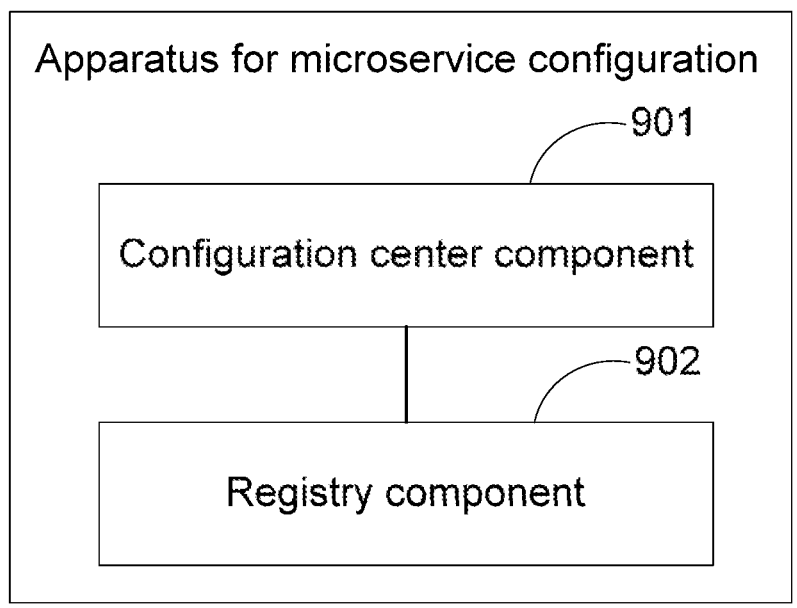
FIG. 9 is a schematic diagram of an apparatus for microservice configuration corresponding to a main cluster according to an embodiment of the present disclosure.

As shown in FIG. 9, an embodiment of the present disclosure provides an apparatus for microservice configuration. The apparatus may be applied to a main cluster, and specifically includes:
- a configuration center component 901, configured to send changed configuration data to each of service clusters in response to configuration data having been changed; and
- a registry component 902, configured to send changed service data corresponding to a service data acquisition request to the corresponding service cluster in response to receiving the service data acquisition request of at least one of the service clusters.

In an optional embodiment, the registry component 902 may further include the following units.
- a registry proxy unit, configured to adaptively process the service data acquisition request of at least one of the service clusters, to obtain an adaptive processing result;
- a service data determination unit, configured to determine the changed service data corresponding to the service data acquisition request according to the adaptive processing result; and
- a service data sending unit, configured to send the changed service data corresponding to the service data acquisition request to the corresponding service cluster.

In an optional embodiment, the configuration center component 901 may further include the following units.
- a configuration data comparison unit, configured to compare received configuration data with stored configuration data, to obtain a comparison result;
- a configuration data updating unit, configured to update the stored configuration data to the received configuration data in response to the comparison result indicating a difference between the received configuration data and the stored configuration data; and
- a configuration data sending unit, configured to take the received configuration data as the changed configuration data and sending the changed configuration data to each of the service clusters.

Figure 10:
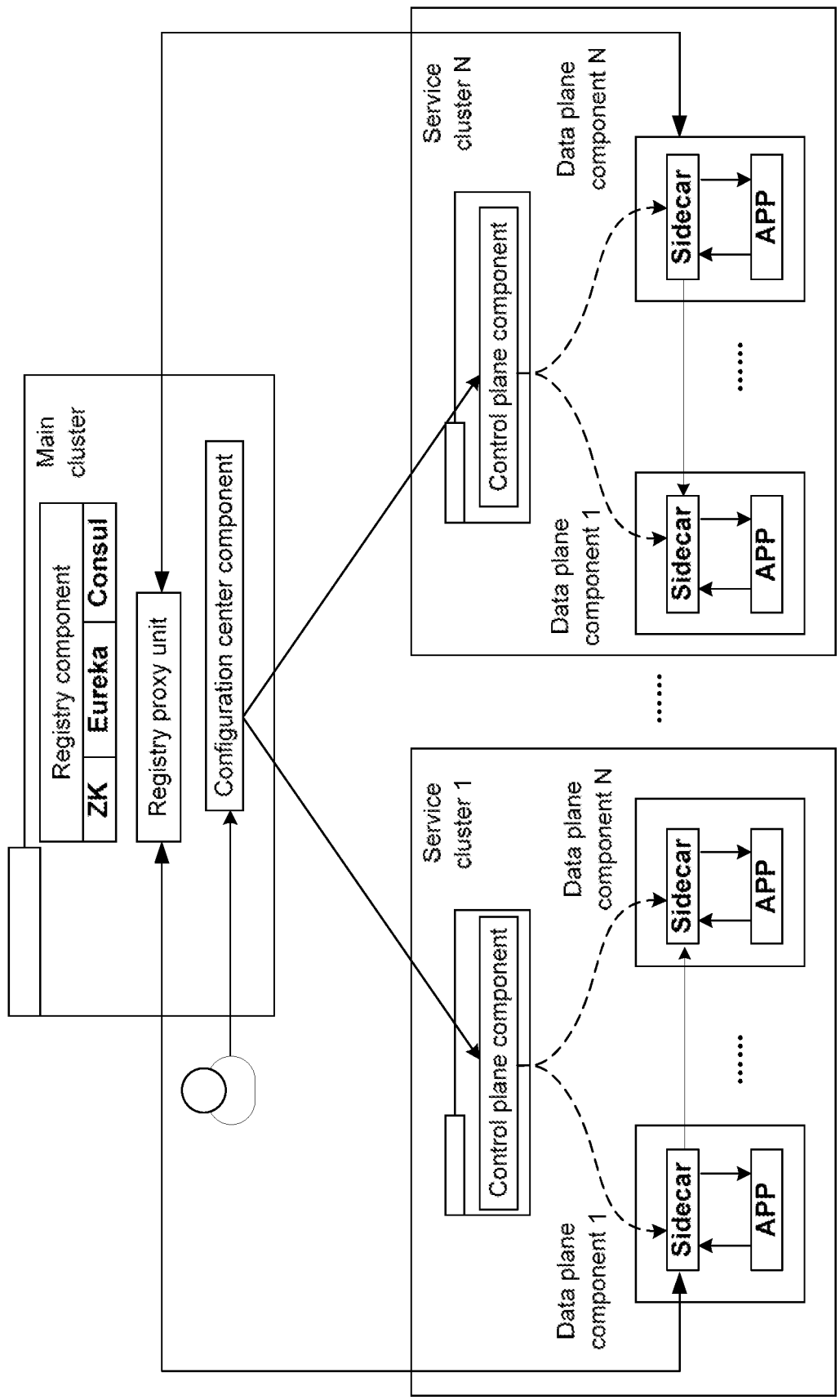
FIG. 10 is a schematic diagram of a microservice system according to an embodiment of the present disclosure.

As shown in FIG. 10, an embodiment of the present disclosure provides a microservice system. The system includes at least one service cluster, each of the at least one service cluster being configured to execute the above method for microservice configuration, applied to service clusters; and a main cluster, configured to execute the above method for microservice configuration, applied to a main cluster.

There may be multiple service clusters, which correspond to service cluster 1 to service cluster N in FIG. 10. N is a positive integer.

Each of the service clusters may further include a control plane component and at least one data plane component. The control plane component may be communicatively connected with a configuration center of the main cluster, and is configured to obtain configuration data sent by the main cluster and send the configuration data to the data plane component. A sending mode may be based on a webhook mechanism.

The data plane component may include a microservice program (APP in FIG. 10) and a sidecar component (Sidecar in FIG. 10) which are deployed together. The sidecar component is configured to send a service data acquisition request to the main cluster when detecting that service data in the main cluster has been changed, receive the changed service data sent by the main cluster, and execute at least one service governance task for the microservice program according to configuration data and the changed service data.

On one hand, a registry component in the main cluster is configured to receive and store service data configured by a client. On the other hand, the registry component is configured to determine changed service data corresponding to the service data acquisition request according to the service data acquisition request sent by the data plane component of the service cluster; and send the changed service data corresponding to the service data acquisition request to a data plane component in the service cluster.

The configuration data may include CRD data.

There are a wide range of registries of microservices for acquiring service data, for example, ZooKeeper (ZK), Eureka, Consul, etc. in FIG. 10.

Since these registries are developed and implemented by different vendors, there is no corresponding data model standard at present, which leads to the need to implement different docking solutions for different registries. In order to shield data model differences of various registries, the present disclosure introduces a registry proxy unit. Data models of different registries are stored in the registry proxy unit in advance. In view of this, when receiving the service data acquisition request sent by the data plane component of any one of the service clusters, the registry proxy unit of the main cluster may adapt to the service data acquisition request.

An embodiment of the present disclosure further provides an electronic device, a readable storage medium and a computer program product.

Figure 11:
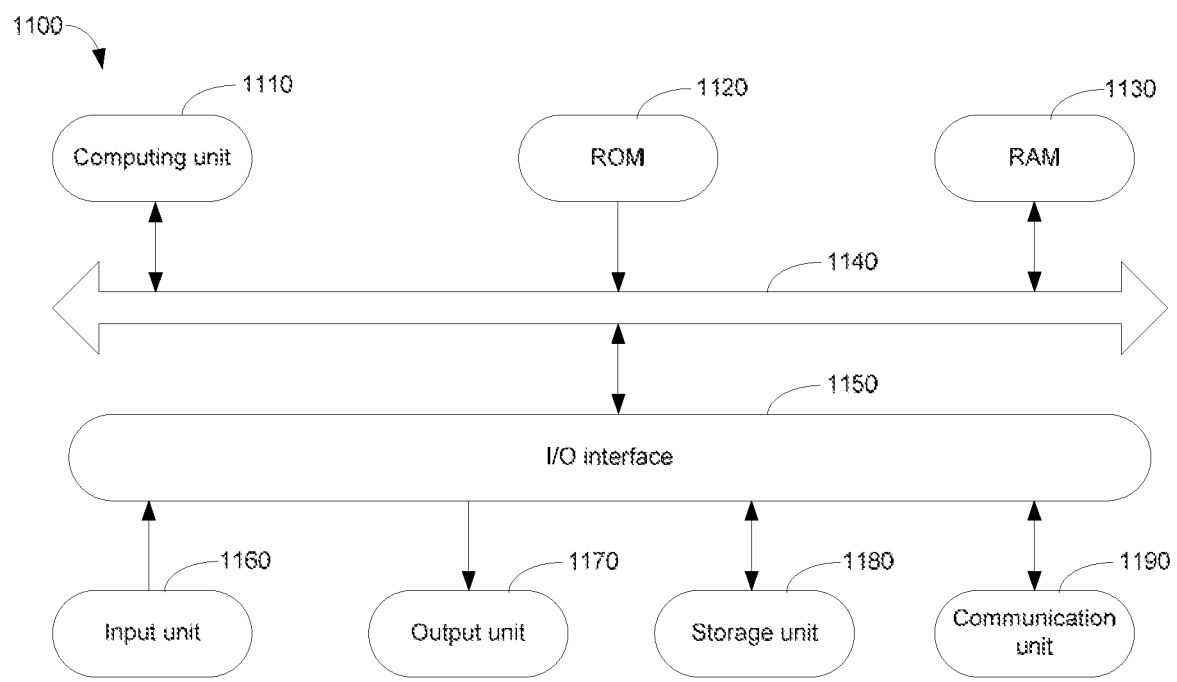
FIG. 11 is a block diagram of an electronic device for implementing a method for microservice configuration according to an embodiment of the present disclosure.

FIG. 11 shows a schematic block diagram of an electronic device 1100 capable of being configured to implement embodiments of the present disclosure. The electronic device is intended to represent various forms of digital computers, such as laptop computers, desktop computers, workstations, personal digital assistants, servers, blade servers, mainframe computers, and other suitable computers. The electronic device may further represent various forms of mobile devices, such as personal digital assistants, cell phones, smart phones, wearable devices, and other similar computing apparatuses. The components illustrated herein, and connection relations and functions of the components are as examples, and are not intended to limit implementations of the present disclosure described and/or claimed herein.

As shown in FIG. 11, the electronic device 1100 includes a computing unit 1110 that may perform various suitable actions and processes according to computer programs stored in a read only memory (ROM) 1120 or computer programs loaded from a storage unit 1180 into a random access memory (RAM) 1130. In the RAM 1130, various programs and data required for the operation of the electric device 1100 may further be stored. The computing unit 1110, the ROM 1120, and the RAM 1130 are connected with one another by means of a bus 1140. An input/output (I/O) interface 1150 is connected with the bus 1140.

Multiple components in the electronic device 1100 are connected with the I/O interface 1150, including: an input unit 1160, such as a keyboard, a mouse, etc.; an output unit 1170, such as various types of displays, loudspeakers, etc.; a storage unit 1180, such as a magnetic disk, an optical disk, etc.; and a communication unit 1190, such as a network card, a modem, a wireless communication transceiver, etc. The communication unit 1190 allows the electronic device 1100 to exchange information/data with other devices by means of a computer network, such as the Internet, and/or various telecommunication networks.

The computing unit 1110 may be a wide range of general purpose and/or special purpose processing components with processing and computing capabilities. Some examples of the computing unit 1110 include, but not limited to, a central processing unit (CPU), a graphics processing unit (GPU), various dedicated artificial intelligence (AI) computing chips, various computing units that run machine learning model algorithms, a digital signal processor (DSP), and any suitable processor, controller, microcontroller, etc. The computing unit 1110 executes the various methods and processes described above, such as the method for microservice configuration. For example, in some embodiments, the method for microservice configuration may be implemented as computer software programs that are physically contained in a machine-readable medium, such as the storage unit 1180. In some embodiments, part or all of computer program may be loaded into and/or mounted on the electronic device 1100 by means of the ROM 1120 and/or the communication unit 1190. When the computer program is loaded into the RAM 1130 and is executed by the computing unit 1110, at least one step of the method for microservice configuration described above may be executed. Alternatively, in other embodiments, the computing unit 1110 may be configured to execute the method for microservice configuration in any other suitable manner (e.g., by means of firmware).

Various implementations of the systems and technologies described above herein may be implemented in a digital electronic circuitry, an integrated circuit system, a field programmable gate array (FPGA), an application specific integrated circuit (ASIC), an application specific standard product (ASSP), a systems on chip (SOC), a complex programmable logic device (CPLD), computer hardware, firmware, software, and/or combinations thereof. These various implementations may include: implement the implementations in at least one computer program. At least one computer program is executable and/or interpretable on a programmable system including at least one programmable processor that may be a special purpose or general purpose programmable processor, and may receive data and instructions from a storage system, at least one input apparatus, and at least one output apparatus, and transfer the data and instructions to the storage system, the at least one input apparatus, and the at least one output apparatus.

Program codes for implementing the methods of the present disclosure may be written by using one programming language or any combination of more programming languages. These program codes may be provided to a processor or controller of a general purpose computer, a special purpose computer, or other programmable data processing apparatuses, such that the program codes, when executed by the processor or controller, causes the functions/operations specified in the flowchart and/or block diagram to be implemented. The program codes may be executed entirely on a machine and partly on the machine, and is executed partly on the machine and partly on a remote machine or entirely on the remote machine or a server as a stand-alone software package.

In the context of the present disclosure, a machine-readable medium may be a tangible medium that may include, or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above. More specific examples of the machine-readable storage medium may include an electrical connection based on at least one wire, a portable computer diskette, a hard disk, a RAM, a ROM, an erasable programmable read-only memory (EPROM or flash memory), an optical fiber, a portable compact disc read-only memory (CD-ROM), an optical storage device, a magnetic storage device, or any suitable combination of the above.

In order to provide interaction with a user, the systems and technologies described herein may be implemented on a computer. The computer is provided with a display apparatus (e.g., a cathode ray tube (CRT) or liquid crystal display (LCD) monitor) for displaying information to the user; and a keyboard and a pointing apparatus (e.g., a mouse or a trackball). The user may provide input for the computer by means of the keyboard and the pointing apparatus. Other kinds of apparatuses may be further configured to provide interaction with the user. For example, feedback provided for the user may be any form of sensory feedback (e.g., visual feedback, auditory feedback, or tactile feedback). Input from the user may be received in any form, including acoustic input, voice input, or tactile input.

The systems and technologies described herein may be implemented on a computing system that includes a back-end component (e.g., as a data server), or a computing system that includes a middleware component (e.g., an application server), or a computing system that includes a front-end component (e.g., a user's computer having a graphical user interface or a web browser, by means of which the user may interact with an implementation of the systems and technologies described herein), or a computing system that includes any combination of the back-end component, the middleware component, or the front-end component. The components of the system may be interconnected by any form or medium of digital data communication (e.g., a communication network). Examples of the communication network include a local area network (LAN), a wide area network (WAN), and the Internet.

A computer system may include a client and a server. The client and the server are generally remote from each other and typically interact with each other by means of the communication network. A relation between the client and the server is generated by means of a computer program running on the corresponding computer and having a client-server relation to each other.

It should be understood that various forms of the flow shown above may be used to resort, add, or delete steps. For example, the steps described in the present disclosure may be executed in parallel or in sequence or in a different order, as long as the desired result of the technical solution disclosed in the present disclosure may be achieved, which will be limited herein.

The above specific implementations are not construed as limiting the scope of protection of the present disclosure. It should be understood by those skilled in the art that various modifications, combinations, sub-combinations, and substitutions may be made according to design requirements and other factors. Modifications, equivalent substitutions, improvements, etc. within the spirit and principles of the present disclosure should all fall within the scope of protection of the present disclosure.

What is claimed is:

1. A method for microservice configuration, applied to service clusters, comprising:
   receiving configuration data from a main cluster;
   sending a service data acquisition request to the main cluster in response to determining that service data in the main cluster has been changed, and receiving changed service data from the main cluster; and
   executing at least one service governance task according to the configuration data and the changed service data, wherein determining that the service data in the main cluster has been changed comprises:
   periodically polling the service data in the main cluster; and
   determining that the service data in the main cluster has been changed in response to a difference between two successive polling results exceeding a corresponding threshold.

2. The method as claimed in claim 1, wherein sending the service data acquisition request to the main cluster in response to determining that service data in the main cluster has been changed comprises:
   determining required service data;
   comparing the changed service data with the required service data to obtain a comparison result in response to determining that the service data in the main cluster has been changed; and
   sending the service data acquisition request to the main cluster in response to the comparison result satisfying a predetermined condition.

3. The method as claimed in claim 1, wherein executing the at least one service governance task according to the configuration data and the changed service data comprises:
   determining a service instance of each of microservice programs according to the changed service data;
   determining parameters in the service instance according to the configuration data; and
   executing a service governance task for each of the microservice programs according to the service instance of each of the microservice programs and the parameters in the service instance.

4. The method as claimed in claim 1, wherein a plurality of service clusters are arranged in different regions respectively, and the at least one service governance task executed by the service clusters in each of the regions are the same.

5. A method for microservice configuration, applied to a main cluster, comprising:
   sending changed configuration data to each of service clusters in response to configuration data having been changed; and
   sending changed service data corresponding to a service data acquisition request to the corresponding service cluster in response to receiving the service data acquisition request of at least one of the service clusters, wherein the service clusters determining that the service data in the main cluster has been changed comprises:
  periodically polling the service data in the main cluster; and
  determining that the service data in the main cluster has been changed in response to a difference between two successive polling results exceeding a corresponding threshold.

6. The method as claimed in claim 5, wherein sending the changed service data corresponding to the service data acquisition request to the corresponding service cluster in response to receiving the service data acquisition request of at least one of the service clusters comprises:
  adaptively processing the service data acquisition request of at least one of the service clusters, to obtain an adaptive processing result;
  determining the changed service data corresponding to the service data acquisition request according to the adaptive processing result; and
  sending the changed service data corresponding to the service data acquisition request to the corresponding service cluster.

7. The method as claimed in claim 5, wherein sending the changed configuration data to each of service clusters in response to configuration data having been changed comprises:
  comparing received configuration data with stored configuration data to obtain a comparison result;
  updating the stored configuration data to the received configuration data in response to the comparison result indicating a difference between the received configuration data and the stored configuration data; and
  taking the received configuration data as the changed configuration data, and sending the changed configuration data to each of the service clusters.

8. The method as claimed in claim 1, wherein the changed service data comprises at least one of modification, deletion and update of the service data by a user.

9. A microservice system, comprising:
  at least one service cluster, each of the at least one service cluster being configured to execute the following steps:
  receiving configuration data from a main cluster;
  sending a service data acquisition request to the main cluster in response to determining that service data in the main cluster has been changed, and receiving changed service data from the main cluster;
  executing at least one service governance task according to the configuration data and the changed service data; and
  a main cluster, configured to execute the following steps:
  sending changed configuration data to each of service clusters in response to configuration data having been changed; and
  sending changed service data corresponding to a service data acquisition request to the corresponding service cluster in response to receiving the service data acquisition request of at least one of the service clusters, wherein determining that the service data in the main cluster has been changed comprises:
    periodically polling the service data in the main cluster; and
    determining that the service data in the main cluster has been changed in response to a difference between two successive polling results exceeding a corresponding threshold.

10. The microservice system as claimed in claim 9, wherein sending the service data acquisition request to the main cluster in response to determining that service data in the main cluster has been changed comprises:
  determining required service data;
  comparing the changed service data with the required service data to obtain a comparison result in response to determining that the service data in the main cluster has been changed; and
  sending the service data acquisition request to the main cluster in response to the comparison result satisfying a predetermined condition.

11. The microservice system as claimed in claim 9, wherein executing the at least one service governance task according to the configuration data and the changed service data comprises:
  determining a service instance of each of microservice programs according to the changed service data;
  determining parameters in the service instance according to the configuration data; and
  executing a service governance task for each of the microservice programs according to the service instance of each of the microservice programs and the parameters in the service instance.

12. The microservice system as claimed in claim 9, wherein a plurality of service clusters are arranged in different regions respectively, and the at least one service governance task executed by the service clusters in each of the regions are the same.

13. The microservice system as claimed in claim 9, wherein sending the changed service data corresponding to the service data acquisition request to the corresponding service cluster in response to receiving the service data acquisition request of at least one of the service clusters comprises:
  adaptively processing the service data acquisition request of at least one of the service clusters, to obtain an adaptive processing result;
  determining the changed service data corresponding to the service data acquisition request according to the adaptive processing result; and
  sending the changed service data corresponding to the service data acquisition request to the corresponding service cluster.

14. The microservice system as claimed in claim 9, wherein sending the changed configuration data to each of service clusters in response to configuration data having been changed comprises:
  comparing received configuration data with stored configuration data to obtain a comparison result;
  updating the stored configuration data to the received configuration data in response to the comparison result indicating a difference between the received configuration data and the stored configuration data; and
  taking the received configuration data as the changed configuration data, and sending the changed configuration data to each of the service clusters.

* * * * *